United States Patent
Shukla

(10) Patent No.: US 6,345,101 B1
(45) Date of Patent: Feb. 5, 2002

(54) CRYPTOGRAPHIC METHOD AND APPARATUS FOR DATA COMMUNICATION AND STORAGE

(76) Inventor: Jayant Shukla, 124 Vista Circle Dr., Sierra Madre, CA (US) 91024

(*) Notice: Subject to any disclaimer, the term of this patent is extended or adjusted under 35 U.S.C. 154(b) by 0 days.

(21) Appl. No.: 09/167,813

(22) Filed: Oct. 7, 1998

(51) Int. Cl.[7] .................................................. H04L 9/00
(52) U.S. Cl. ....................... 380/210; 380/200; 380/212; 380/255; 380/268; 380/109; 713/150
(58) Field of Search ................................ 380/200, 210, 380/212, 255, 268; 713/150

(56) References Cited

U.S. PATENT DOCUMENTS

| | | | |
|---|---|---|---|
| 3,962,539 A | 6/1976 | Ehrsam et al. ................ | 178/22 |
| 4,172,213 A | * 10/1979 | Barnes et al. ................ | 178/22 |
| 4,405,829 A | 9/1983 | Rivest et al. ............... | 178/22.1 |
| 4,995,082 A | 2/1991 | Schnorr ....................... | 380/23 |
| 5,214,703 A | 5/1993 | Massey et al. ................ | 380/37 |
| 6,038,321 A | * 3/2000 | Torigai et al. ............... | 380/268 |
| 6,088,456 A | * 7/2000 | McCracken et al. ........ | 380/259 |

OTHER PUBLICATIONS

Richard F. Graveman Crypto '99 Conference Report. "IEEE Computer Society Technical Committee on Security and Privacy".

Web Page: http://www.ieee-security.org/cipher/confReport/1999/CR1999-crypto99.html Published: Aug. 1999.

* cited by examiner

Primary Examiner—Christine T. Tu
Assistant Examiner—Todd Jack

(57) ABSTRACT

The disclosed invention is a new cryptographic method which is fast and ideally suited for secure, high volume data communication and storage. The data is encrypted at the source using a private key and then transmitted to a destination over a secure or insecure channel. The destination can either be a local storage device or a non-local station. At the destination the data is decrypted using the same private key. The disclosed invention is a new method and apparatus for data encryption. The mathematical robustness and simplicity of this method brings a great improvement in security and speed as compared to previous block ciphers. The data block length or the key length can also be changed very easily and such changes do not require any significant redesigns in the components of the cipher. This is a significant advantage over previous block ciphers, where extensive modifications are needed if the key or the data block length is to be altered, if this is even feasible.

20 Claims, 15 Drawing Sheets

Da : Plain-text to be transmitted from station a to station b
Db : Plain-text to be transmitted from station b to station a
Ea : Cipher-text of data Da that is transmitted
Eb : Cipher-text of data Db that is transmitted
K : Key used for encryption and decryption K : Key used to encrypt/decrypt the data
D : Plain-text data
E : Cipher-text data

XOR1 Operation

Logical XOR truth table

| X/Y | 0 | 1 |
|---|---|---|
| 0 | 0 | 1 |
| 1 | 1 | 0 |

```
S    0 1 0 1 1 1 0 ... ... ...  0 0 1 1
D    1 0 0 1 1 0 0 ... ... ...  1 1 0 1
D1   1 1 0 0 0 1 0 ... ... ...  1 1 1 0
```

S is the string used for the XOR operation
D is the data block
D1 is the data block after the XOR operation

Figure 4

SHUFFLE1 Operation

K    0 1 1 0 1 0 0 1 1 1
D1   1 1 0 1 0 1 0 0 1 0

F1     1    1   1 0
F2    1 0   0     0 1 0
D2    1 0 0 0 1 0 1 1 1 0

The shuffled data D2 is obtained by concatenating the string F1 to the string F2.

K     is the key
D1   is the data block
D2   is the data block after shuffling

XOR2 Operation($\oplus$ = Logical XOR)

Data block  X1  X2  X3  X4  X5  X6  X7  X8
New  block X1' X2' X3' X4' X5' X6' X7' X8'

Where,
    Xi are the bits of the data block before the XOR2 operation
    Xi' are the bits of the data block after the XOR2 operation
and, $X1' = X1$
$X2' = X1 \oplus X2$
$X3' = X1 \oplus X2 \oplus X3$
$X4' = X1 \oplus X2 \oplus X3 \oplus X4$
$X5' = X1 \oplus X2 \oplus X3 \oplus X4 \oplus X5$
$X6' = X1 \oplus X2 \oplus X3 \oplus X4 \oplus X5 \oplus X6$
$X7' = X1 \oplus X2 \oplus X3 \oplus X4 \oplus X5 \oplus X6 \oplus X7$
$X8' = X1 \oplus X2 \oplus X3 \oplus X4 \oplus X5 \oplus X6 \oplus X7 \oplus X8$

Figure 6

XOR3 Operation ($\oplus$ = Logical XOR)

Data block X1' X2' X3' X4' X5' X6' X7' X8'
New block X1   X2   X3   X4   X5   X6   X7   X8

Where,
    Xi' are the bits in the data block before the XOR3 operation
    Xi are the bits of the data block after the XOR3 operation and,
$X1 = X1'$
$X2 = X1' \oplus X2'$
$X3 = X2' \oplus X3'$
$X4 = X3' \oplus X4'$
$X5 = X4' \oplus X5'$
$X6 = X5' \oplus X6'$
$X7 = X6' \oplus X7'$
$X8 = X7' \oplus X8'$

Figure 7

Data block  X1  X2  X3  X4  X5  X6  X7  X8
New block  X1' X2' X3' X4' X5' X6' X7' X8'

Where,
    $X_i$ are the bits in the data block before the XOR2 (alternate embodiment)
    $X_i'$ are the bits of the data block after the XOR2 operation.

and,
$X_1' = X_1$
$X_2' = X_1 \oplus X_2$
$X_3' = X_2 \oplus X_3$
$X_4' = X_3 \oplus X_4$
$X_5' = X_4 \oplus X_5$
$X_6' = X_5 \oplus X_6$
$X_7' = X_6 \oplus X_7$
$X_8' = X_7 \oplus X_8$

Figure 8

Data block  X1' X2' X3' X4' X5' X6' X7' X8'
New  block X1  X2  X3  X4  X5  X6  X7  X8

Where,
    Xi are the bits of the data block before the XOR3 (alternate embodiment) operation.
    Xi' are the bits of the data block after the XOR3 operation
and, $X1 = X1'$
$X2 = X1' \oplus X2'$
$X3 = X1' \oplus X2' \oplus X3'$
$X4 = X1' \oplus X2' \oplus X3' \oplus X4'$
$X5 = X1' \oplus X2' \oplus X3' \oplus X4' \oplus X5'$
$X6 = X1' \oplus X2' \oplus X3' \oplus X4' \oplus X5' \oplus X6'$
$X7 = X1' \oplus X2' \oplus X3' \oplus X4' \oplus X5' \oplus X6' \oplus X7'$
$X8 = X1' \oplus X2' \oplus X3' \oplus X4' \oplus X5' \oplus X6' \oplus X7' \oplus X8'$

Figure 9

SHUFFLE2 Operation

K    0 1 1 0 1 0 0 1 1 1     six "1" bits & four "0" bits
E1   1 1 0 1 0 1 0 0 1 0

F1   1 1 0 1 0 1     first six elements of D
F2   0 0 1 0        last four elements of D

E2   0 1 1 0 0 1 0 1 0 1

K    is the key
E1   is the data block
F1   intermediate data block
F2   intermediate data block
E2   is the data block after shuffling

```
MAIN Routine
{
// initialize the keys
Initialize_Key_function();
//
// do we need to encrypt data
//
if( Do_Encrypt )then
        Encrypt_Data_Function();
endif
//
// do we need to decrypt data
//
if(Do_Decrypt)then
        Decrypt_Data_Function();
endif
}

// Encryption Function
Encrypt_Data_Function
{
  Loop N rounds
    {
      XOR1_Operation();
      SHUFFLE1_Operation();
      XOR2_Operation();
    }
}

// Decryption Function
Decryt_Data_Function()
{
  Loop N Rounds
    {
      XOR3_Operation();
      SHUFFLE2_Operation();
      XOR1_Operation();
    }
}
```

Figure 12

| Key | 00011101 |
|---|---|
| Data | 12345678 |
| Iteration 1 | 45681237 |
| Iteration 2 | 81274563 |
| Iteration 3 | 74538126 |
| Iteration 4 | 38167452 |
| Iteration 5 | 67423815 |
| Iteration 6 | 23856741 |
| Iteration 7 | 56712384 |
| Iteration 8 | 12345678 |

Figure 14

| Key         01101001<br>XOR string 11001101 | Data block 1 | Data block 2 |
|---|---|---|
| Iteration 0 | 00010001 | 00010000 |
| Iteration 1 | 11001011 | 11010100 |
| Iteration 2 | 00000010 | 00100111 |
| Iteration 3 | 11010010 | 10110001 |
| Iteration 4 | 01011101 | 10111011 |

Figure 15

CRYPTOGRAPHIC METHOD AND APPARATUS FOR DATA COMMUNICATION AND STORAGE

BACKGROUND OF THE INVENTION

There are many real world situations when one would like to protect the information in a message, or any kind of data in general from an eavesdropper. For example, one might need to communicate between two stations over a link that is not secure or one might need to store data at an insecure location. Cryptographic methods provide the means to protect such data. By encrypting the data, one makes it an almost infeasible task for an unwanted third person to obtain the original data from the encrypted data. If only the encrypted data is transmitted over or stored at an insecure channel, then the original data or the information in the data is secure from an eavesdropper.

Cryptographic methods use an algorithm (a sequence of mathematical operations) and one or more "keys" to encrypt and decrypt the data. Security of the data to be communicated or stored over insecure channels relies on the fact that the algorithm used for encryption has no inherent weaknesses which can be exploited to break the algorithm. At the same time no eavesdropper should be able to intercept all or part of the keys that were used for encryption.

Encryption, involves transforming the original data or "plain-text" into encrypted data or "cipher-text." As described by Shannon [3], the idea behind encryption is to use confusion and diffusion to hide any easy to spot relationship between the plain-text and the cipher-text. Confusion is introduced by changing plain-text locally and diffusion is introduced by spreading the plain-text over a larger region in the cipher-text. The encryption method should be such that one can encrypt the plain-text rather easily, while decryption is very hard without the key, but can be done very easily with the key.

A common class of cryptographic methods, known as "symmetric algorithms," uses the same key for both encryption and decryption. "Symmetric algorithms" that encrypt a fixed-sized data block at a time are called "block ciphers." A very popular block cipher is DES, which was developed by IBM. It uses repeated applications of permutations (rounds), substitutions (based on a lookup tables which are called S-boxes, E-boxes and P-boxes), interchanging the left and the right half of the data block and exclusive OR operations (XORs). A detailed description of DES can be found in Ehrsain [1].

DES has undergone extensive scrutiny by the cryptographic community. In the scientific community there are a few unanswered questions about the DES algorithm, e.g. why it has only 16 rounds and how and why its particular S-boxes, E-boxes and P-boxes were chosen. It has also been demonstrated by Shamir and Biham [4], that reduced-round (fewer than 16 round) variants of DES are susceptible to differential cryptanalysis.

The security of an encryption method can be increased by using many complex operations from different algebraic groups for encryption. The disadvantage is that these complex operations require a lot of processing time. The complexity of these operations can also make it difficult to see if a trapdoor is hidden somewhere in the method. A trapdoor is some property of the encryption method that can be exploited to obtain the key more easily than a brute-force, exhaustive search of possible keys.

Another popular block cipher is IDEA. The IDEA cipher derives its security by mixing operations from different algebraic groups. A detailed description of the algorithm can be found in Massey [2]. The operations used in IDEA are the following:

Addition modulo $2^{16}$

XOR multiplication modulo $2^{16}+1$

The above mentioned examples of block ciphers help illustrate different ways of constructing block ciphers. They also help point out the shortcomings of the common block ciphers when used in real world applications. One can broadly classify the shortcomings of block ciphers into:

Susceptibility to cryptanalysis. Shamir and Biham[4] have successfully cryptanalysed many block ciphers, including DES, using differential cryptanalysis. Differential cryptanalysis has been very successful in breaking ciphers that use S-boxes. Other methods of cryptanalysis, such as linear cryptanalysis and dictionary attacks, have also been studied and used in this context extensively.

Resource intensiveness. Ciphers such as IDEA use multiplication and addition to enhance their security, but these operations are computationally intensive. One can increase encryption speed by using specialized hardware implementation of these algorithms. Because of the complexity of the operations used in the algorithms, even such hardware can be complex and expensive. In certain applications such as mobile communications, cost and power consumption are very important factors and should be kept as low as possible.

I have designed a method and apparatus for data communication and storage that addresses the above mentioned concerns about block ciphers. The invention can be used for many applications, including, but not limited to:

Secure message exchange in mobile communications.

Secure data transfer over the internet.

Secure online financial transactions by securing credit card numbers or pin numbers for financial transactions.

Transmission of data to and from the satellites.

Prevention of unauthorized access to the contents of files stored on storage mediums such the computer hard drives, floppy disks, and random access memory (RAM), as well as other electronic, magnetic and optical storage media.

Encryption of information stored in integrated circuit memories so that its designs are harder to reverse engineer.

SUMMARY OF THE INVENTION

I present a new method and apparatus to secure data from, among things, eavesdroppers, by encrypting it. The encrypted data can be either transmitted to the destination or stored at a desired location.

The invention avoids the use of many standard techniques used in encryption methods such as multiplication, addition, discrete logarithms, S-boxes. The invention uses the XOR operation along with a new way to shuffle data blocks that can be easily implemented in hardware. In addition, these operations allow for the data block size and key size to be changed without significant modifications to the overall method. The latter, in particular, is a significant advantage over previous block ciphers such as DES where changes in the data block size or key length necessitate redesigning of the S-boxes, E-boxes and P-boxes. And since the operations used in the method are simple and their properties well-understood in the art, trapdoors are unlikely to be present.

To produce the cipher-text of a given plain-text in the method, one needs a key, K, and a data string, S, which is used for the XOR operation. The steps involved in encryption and decryption are as follows:

Generation of the key K, and a string S, which are the same length as defined for the data blocks. The key is used for the shuffle operation and the string is used for one of the XOR operations.

Splitting of the plain-text into data blocks of fixed length. If the last data block is smaller than the desired size, it is padded with extra bits to make it the same size as the other data blocks.

Repeated application (also known as "rounds") of three operations. The first operation is the XOR of the data block D, with the string S, to obtain a new data block, D1=XOR1(D,S). The second operation shuffles the bits of the data block D1, to obtain a new data block, D2=SHUFFLE(D1,K). The last operation of every round is a second type of XOR that uses the bits of the data block D2, and produces a new data block D3=XOR2(D2). After the last round we obtain the cipher-text which will be referred to as E. These operations will be described in more detail below.

To decrypt the cipher-text E, I follow a procedure similar to the one used to encrypt the data. The number of rounds remains the same and each round has three operations. The operations are modified so that they reverse the effect of the operations used for encryption. The first operation is an XOR operation, XOR3, which reverses the effect of the XOR operation XOR2. If we start with cipher-text E, then the new data block after the XOR3 operation is E1=XOR3(E). Next we reverse the effect of the shuffle operation. We perform the shuffle operation on the data block E1 using the key K (to be precise, the complement K' of the key), to obtain an intermediate data block E2=SHUFFLE(E1,K'). The last operation of each round is the XOR operation, XOR1, which is the same XOR1 used in encryption. This produces a new data block E3=XOR1(E2,S). After the last round we obtain the original data block D.

The purpose of the XOR1 operation is to introduce whitening (hiding information about the relative number of ones and zeroes) into the data. I XOR the data block with a randomly-selected string that has the same number of bits as the data block does. A data block which contains only zeros, when XORed with a string with a nearly equal number of zeros and ones, will produce a new string which has a nearly equal number of zeros and ones. Randomly-selected strings will not cause this problem. The string used for XOR1 is not part of the key. It can be made public or private depending on the wishes of the individual. I recommend encrypting the string used for the XOR1 operation by applying a few rounds of the shuffle operation and/or XOR2 (see below), to it, and then placing it at the begin of the cipher-text. Thus someone with the key K, can first obtain the string S, decipher the cipher-text.

The second XOR operation, XOR2, depends only on the data block, and thus allows the bits in the data block to directly influence the values of the bits in the new data block. It is desirable for each bit in the data block to influence as many bits in the new data block as possible. This is achieved by XORing bits of the data block with other bits in the data block to produce the new data block. As shown in FIG. 6, the first bit, X1, of the data block will influence all the bits of the new data block. The second bit, X2, of the data block will influence bit two onward bits of the new data block, and so on. Because of this, even a small change in the plain-text data block will result in a very different cipher-text. FIG. 8 shows an alternative embodiment of the second XOR operation, XOR2. One can easily generate a few more embodiments by just repeating and/or mixing the steps shown in FIG. 6 and FIG. 8.

The shuffling operation creates diffusion in the data by moving the bits around. The shuffling operation is similar to the way one shuffles a deck of playing cards. To shuffle a deck of cards, some cards are removed from the deck and then placed at the top or the bottom of the deck, a process that is repeated several times. I achieve a similar effect by removing some of the bits from the data block to produce two new data blocks and then concatenating them. FIG. 5 illustrates how the bit-shuffling operation is done. The data block D1, is split into two blocks, F1 and F2. The new data block D2, is obtained by concatenating the data blocks F1 and F2 together. One can either put the block F1 after F2 or vice-versa to obtain the block D2. The forthcoming examples will set forth variations on this step. With several rounds of shuffling, one can alternate between D2=F1F2 in a round and D2=F2F1 in the next round. The process of generating data blocks F1 and F2 from the original block D is done with the help of the key K. I start at the beginning of the data block D1. If the corresponding bit in the key is zero, I move the bit from the data block to the new block F1. If the corresponding bit of the key is one, I move the bit from the data block to the block F2. After I have finished this operation for all the bits in the data block I will have two new data blocks, F1 and F2. I construct a new data block D2, by concatenating the data block F1 behind the data block F2.

BRIEF DESCRIPTION OF THE DRAWINGS

FIG. 4 shows the first XOR operation that is performed on the data block in every round. The bits of the string S and the data block D are XORed, according the XOR truth table, together to produce a new data block D1.

FIG. 6 explains the second XOR operation, XOR2, where I use only the bits in the data block to produce a new data block. The bits of the old data block are represented by Xi and the bits of the new data blocks by Xi'.

FIG. 7 shows the first XOR operation of every round during decryption. This XOR operation, XOR3, reverses the effect of the XOR operation, XOR2, that is used during encryption. The bits of the old data block are represented by Xi' and the bits of the new data blocks by Xi.

FIG. 8 shows an alternate embodiment of the XOR operation, XOR2. The bits of the old data block are represented by Xi and the bits of the new data blocks by Xi'.

FIG. 9 shows how to reverse the effect of the XOR operation shown in FIG. 8. The bits of the old data block are represented by Xi' and the bits of the new data blocks by Xi.

FIG. 12 illustrates a possible hardware implementation. The data input/output is done via data input port 28 and data output port 29. The key 32 is read in using a key reader 31, and the encryption/decryption operations are performed by a digital signal processor or an application specific integrated circuit chip 30 according to the user commands 33.

FIG. 14 show the encryption method applied to two data blocks that differ by only one bit. Four rounds were used to encrypt the data blocks and the state of the data blocks is shown after each round.

DESCRIPTION OF PREFERRED EMBODIMENTS

Figure 1:
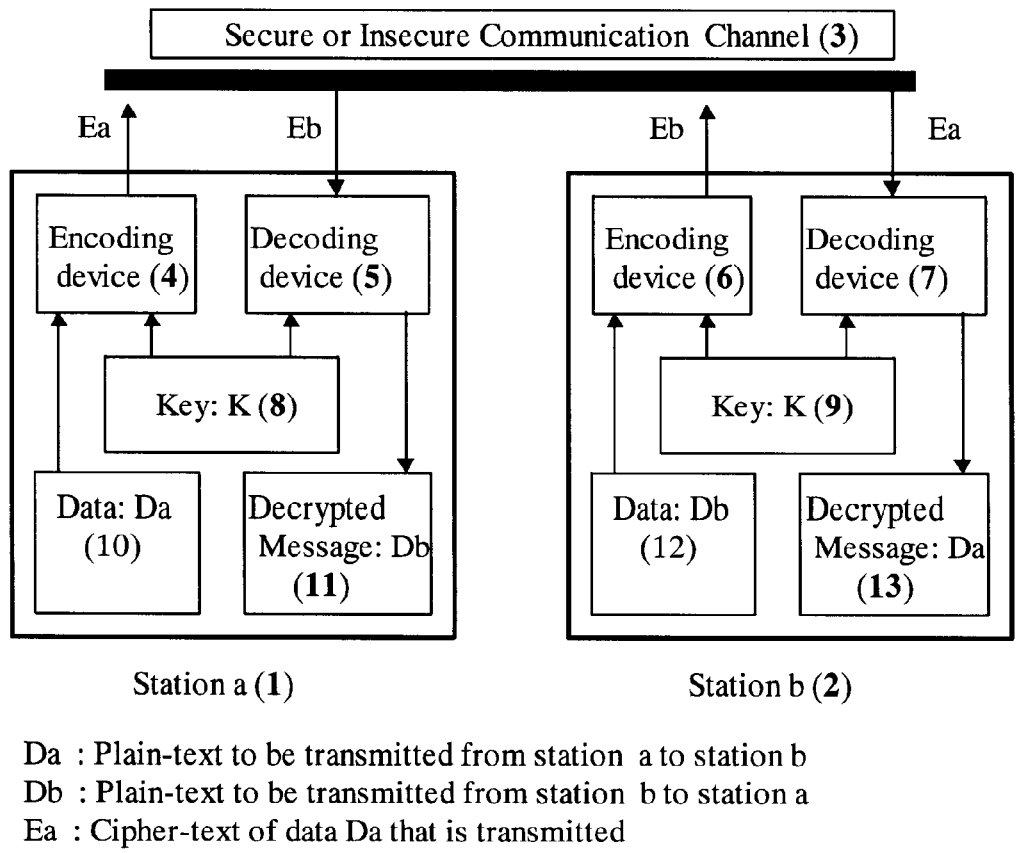
FIG. 1 describes a protocol for data communication over a channel 3 that is not secure. At each station 1, 2 there is a resource (encoding device) 4, 6 that encrypts the data D 10, 12, using a key K 8, 9, to produce cipher-text E. The stations have to share one or more keys that will be used to encrypt and decrypt the messages. There also exists at each station a resource 5, 7 to decipher any incoming cipher-text from the other station.

FIG. 1 shows an embodiment of the present invention. The system is for secure communication between two stations. The two stations, station a 1 and station b 2, share knowledge of the key K 8 (which is the same as the key K 9), which is used for encrypting the plain-text and decrypting the cipher-text. The plain-text of the data to be transmitted fromn station a 1 to station b 2 is Da 10, similarly Db 12 is the plain-text of the data to be transmitted from station b 2 to station a 1. Using the key K 8, the plain-text Da 10 is converted into cipher-text Ea. My encryption method makes it a computationally infeasible task to obtain Da 10 from Ea without knowledge of the key K 8. Because of this, the cipher-text Ea can be transmitted to station b 2 over a communication channel that is insecure. At the station b 2, the cipher-text Ea can be decrypted to obtain the original plain-text Da 13. Following the same procedure, the plain-text Db 12 is encrypted at station b 2 to produce the cipher-text Eb. The cipher-text Eb is transmitted over a communication channel, that need not be secure, to station a 1. At station a 1 the cipher-text Eb is decrypted to produce the plain-text Db 11. This way the two stations can securely communicate with each other without letting an eavesdropper gain access to their plain-text.

Figure 2:
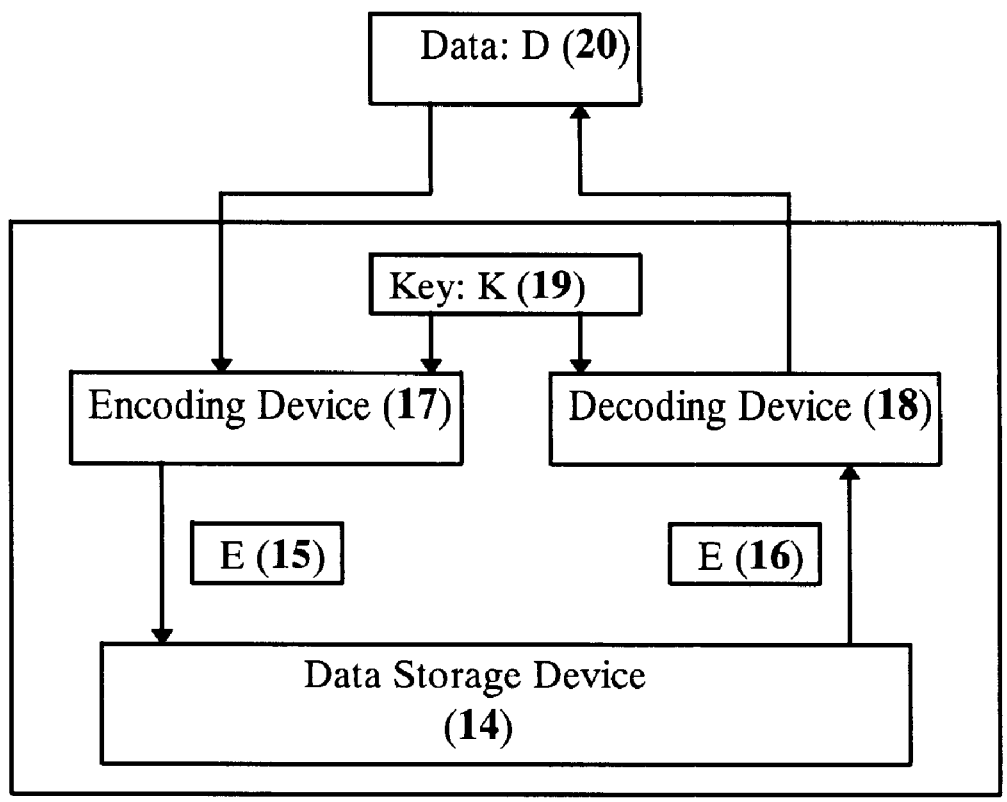
FIG. 2 describes how data 20 can be encrypted to produce cipher-text 15, 16 using an encoding device 17 and a key 19 securely stored on a data storage device 14. A decoding device 18 is used to decrypt any cipher-text 16 stored on the data storage device.

An embodiment of the present invention as shown in FIG. 2 can be used to secure data storage. The data (plain-text) D 20, is encrypted by the encoding device to produce the cipher-text E 15 with the help of the key K 19. The cipher-text E 15 is then transferred to the data storage device. This data storage device 14 that stores the cipher-text need not be secure. To obtain the plain-text D 20, the decoding device reads the cipher-text 16 from the data storage device 14 and then with the help of the key K 19 decrypts it.

The inner workings of the encryption algorithm are outlined in FIG. 3 to FIG. 9. The data is split into fixed size data blocks D, before encryption. A key K and another data string S are generated. The string S is used for the XOR operation XOR1. The plain-text is encrypted one block at a time. To encrypt the data block D, I apply several rounds of three operations. The operations are: an XOR operation, XOR1, using the string S, a shuffle operation and another XOR operation, XOR2, that uses only the data block. I recommend using thirty-two rounds for a sixty-four bit data block. Below I will discuss the periodic properties of the shuffle operation which help decide the optimal number of rounds. In the preferred embodiment, the number of bits in the data block D, the key K and the XOR string S should be same. At the end of the last round I get the cipher-text E of the data block D.

FIG. 4 shows how the first XOR operation, XOR1, is performed. The randomly generated data string S, when XORed with the data block D, produces a new data block D' which is used in the next operation. This operation, XOR1, helps hide the relative number of zeros and ones in the data block D. The string S, which is needed along with the key K, to decrypt the cipher-text can either be made public or be transmitted along with the key (or even be included in the cipher-text). If the string S is to encrypted and included in the cipher-text, it is preferable to encrypt it using the same procedure described in FIG. 3, but skipping the first XOR operation, XOR1, in every round. Anyone with knowledge of the key can thus recover the string S and then use it along with the key to decrypt the cipher-text.

Figure 5:
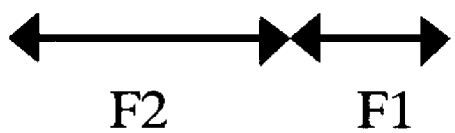
FIG. 5 illustrates the shuffling operation. The data block D1 is split into to intermediate data blocks F1 and F2 using the key K. The data blocks F1 and F2 are concatenated together to produce the shuffled data block D2.

After the XOR operation, XOR1, I use a highly non-linear operation to increase diffusion and confusion by shuffling the bits of the data block. FIG. 5 illustrates how the shuffle operation proceeds. During encryption the shuffle operation comes after the first XOR operation, XOR1. During decryption it comes after the third type of XOR operation, XOR3. The shuffle operation splits the data block D1, into two blocks, F1 and F2 with the help of the key K. Starting from the beginning of the data block D1, the bits are moved to data block F1 if their corresponding bit in the key is zero, else they are moved to the data block F2. The new data block D2, is obtained by concatenating the data blocks F1 and F2 together. One can either put the block F1 after F2 or vice-versa. In the examples I will describe variations on the shuffle operation. This shuffle operation has a few interesting properties.

If the first bit of the key (K) is one, then the first bit of data block (D1) and new data block (D2) are the same.

If the last bit of the key (K) is zero, then the last bit of the data block (D1) and the new data block (D2) are the same.

If we repeatedly apply just the shuffle operation to a data block, after certain a number of iterations we will get back the original data block.

Figure 13:
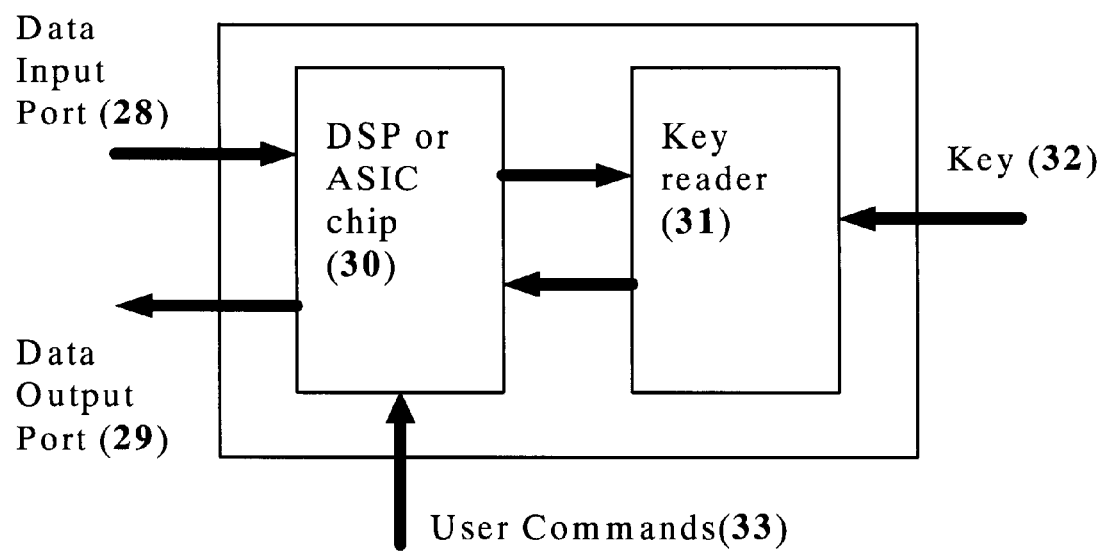
FIG. 13 shows the state of the 8-bit data block after each application of the shuffle operation. Digits were used to uniquely identify the bits as they move during the shuffle operation.

The number of iterations required to get back the original data block depends on the key. The concepts of "bit-period" and "shuffle-period" are useful ones here. The shuffle-period of a key is the number of shuffle operations that are required before we get back the original data block. Similarly, bit-period is the number of shuffle operation required for a particular digit (or bit) at a particular position to return to its original position FIG. 13 shows how the shuffle operation moves the digits (or bits) of a data block. We use digits in place of bits to show clearly how they move during the shuffle operation.

From FIG. 13 we can see that the positions occupied by the digit "4" through the shuffle operations are 4-1-5-2-6-3-7-8-4. That makes the bit-period of the digit "4" equal to eight. In the example shown in the FIG. 13, the bit-period of all other digits is also equal to eight. This makes the shuffle-period (which is the greatest common devisor of all the bit-periods) of the key also equal to eight, and after eight shuffle operations we get back the original data block that we started with.

The bit-period and shuffle-period of a method have strong implications its security. A method with a relatively higher bit-period means that each bit in the data block will visit relatively more positions in the data block before returning to its original position, and thus be more difficult to cryptanalyse. The same reasoning applies to shuffle-periods. The entropy (amount of disorder or scrambling) introduced into the data will increase with increase in the number of bits of the data block can influence the bits in the encrypted data block. For a given key, the maximum entropy occurs when all the number of shuffles applied is equal to half the shuffle-period method (the shuffle-period for a block of bits being equal to the greatest common divisor of the bit-periods). Varying the number of rounds in a method is not a very attractive alternative, therefore, we recommend that if the data block is 64 bits, that the number of rounds be set to 32.

The bit-periods and shuffle-periods of the disclosed method are effectively augmented by the accompanying XOR operations. Application of the XOR1 operation may increase half the bit-periods of by two-fold if the string used is random, then there is a chance that the shuffle-period may increase two-fold, which is a significant increase. The XOR2 operation will increase the bit-periods and shuffle-period even more. Ideally the total shuffle-period should be close to $2^n$, where "n" is the number of bits in the data block. This is because there are $2^n$ permutations on the original data block, and it is preferable for the data block to have a shuffle-period near this $2^n$.

After the shuffle operation we perform XOR2. The reason for introducing this operation is to enable bits of the data block to directly influence the bits of the new data block. For example, if we take two data blocks that only differ at only one position then the two data blocks after the shuffle operation will still differ from each other at only one position. This would make a method susceptible to differential cryptanalysis. FIG. 6 shows how the bits of the data blocks are XORed to generate a new data block. In the new data block, the first bit of the old data block influences all the bits of the new data block, the second bit of the data block influences bits second onwards of the new data block and so on. Because of this, changing just one bit in the data block (plain-text) will result in a significantly different cipher-text, as demonstrated in FIG. 14, which shows two data blocks that differ at only one position but result in substantially different cipher-texts (differing at five positions).

FIG. 8 shows another way of achieving similar effect by another step. Here we do the XOR operation between two adjacent bits only. This way a particular bit affects at most two bits in the new block. Repeated application of the operation shown in FIG. 6 (or FIG. 8) can be used to increase the number of bits that will be influenced by a particular bit. FIG. 7 (or FIG. 9) shows how the effect of the XOR operation shown in FIG. 6 (or FIG. 8) can be reversed.

The process of decryption is similar to the encryption process. We keep the number of rounds exactly the same and each round has three operations. The only differences are:
The first operation is XOR3, shown in the FIG. 7. This operation reverses the effect XOR2, as shown in FIG. 6.
The complement of key K, which is K', is used for the shuffle operation. K' is obtained by replacing all the zeros in the original key by ones and the ones by zeros. This is equivalent to using K but reversing the way the strings F1 and F2 are concatenated together during the shuffle.
The third operation is XOR, which is a XOR between the data block and the data string S, as shown in FIG. 4.

Thus, at the end of the last round we get back the original data block D that was used to produce the cipher-text E.

EXAMPLES

Example 1

Figure 10:
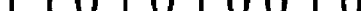
FIG. 10 outlines how a software implementation works on a computer which consists of a central processing unit 23, a hard disk 24, a device to read the key 25, memory 26 to store data and programs during execution and a display 27. The data input/output is done via a data input port 21 and a data output port 22.
Figure 11:
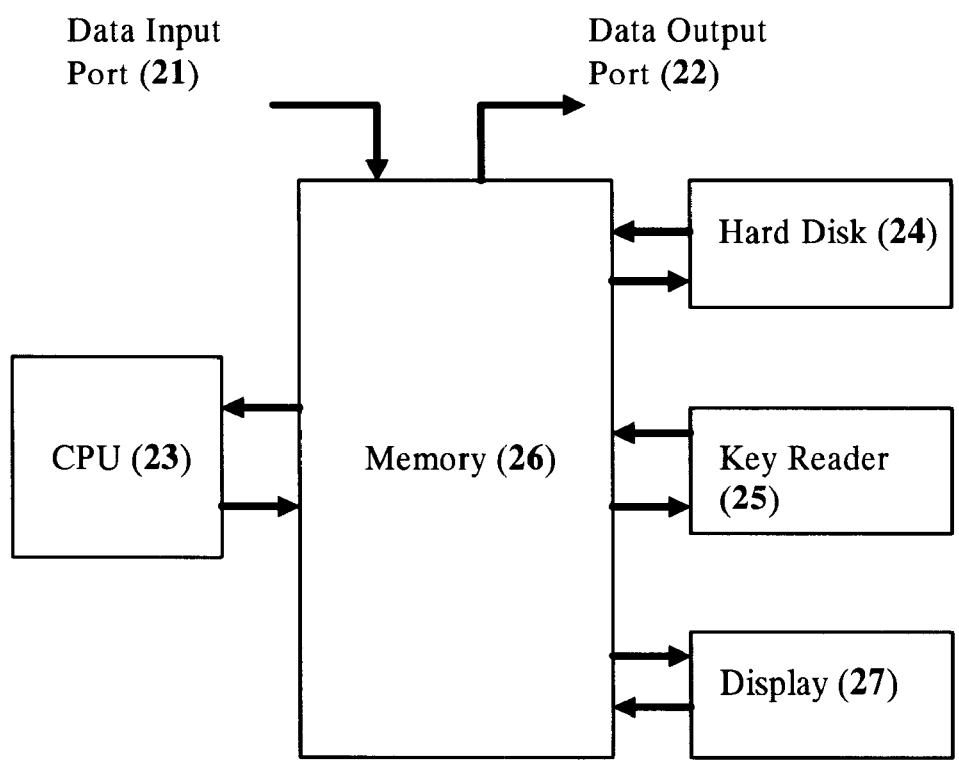
FIG. 11 shows a coarse pseudo code to encrypt/decrypt data and generate keys.

A computer program is written that implements the method to encrypt and/or decrypt data. A computing device, like a personal computer, can be used. FIG. 10 represents such a device and illustrates several of its important components that will play a major role in encryption/decryption. The program will normally reside on the Hard Disk 24 of the computer, but other storage medium like a floppy or a compact disk can be used. Memory 26 is where part or all of the program will reside during execution along with the key. During encryption the data will be read in from the Data Input Port 21 and stored temporarily into the memory of the computer. The program is executed by the CPU 23 of the computer and after the data is encrypted/decrypted it is sent to the desired destination via the Data Output Port 22. The Data Input/Output Ports can be links to other computers or to a data storage medium. Desirable information can be displayed to the user on the Display 27.

Example 2

The hardware encryption/decryption device can be in the form of a Digital Signal Processor (DSP) board or a similar device, that would plug into the computer. It could also be a stand alone device that will receive data to be encrypted or decrypted through a link. The processed data is sent out through the same or a different link. The device will have a microprocessor or a digital signal processor or a custom integrated circuit chip that will perform all the mathematical operations. The instruction set that the DSP or the microprocessor will execute to encrypt/decrypt the data will be stored in an onboard memory. Most of the off-the-shelf DSP boards have some onboard memory along with a mechanism to download the instruction set. The device will be equipped with a Key Reader 31 that in the simplest case can read the Key 32 via the input from the keyboard, or in more sophisticated case, read it from a storage medium like a magnetic strip or a smart card. The data reaches the DSP 30 via the Data Input Port 28 and after it is processed it is returned to its destination via Data Output Port 29. The User Commands 33 provides a channel which can be used to control the functionality of the device.

Example 3

Another aspect of the current invention is the generation of pseudo-random numbers, which can be used to encrypt data, among other uses. Because the method has an extremely large shuffle period for any given key, an extremely large sequence of numbers can be generated before repetition in the pattern of numbers begins to appear.

Pseudo-random number generation ("PRNG") uses a key K, and a data string S, to operate on another data string S2, which is the length as S. In each round of the PRNG, S2 is first XORed with S, just as in the XOR1 operation described in FIG. 4. The string is then shuffled using the key K, just as described in FIG. 5. Finally, the string is XORed using the XOR2 operation described in FIG. 6, thus giving us the new pseudo-random number. The new number is then used as the new S2 for generation of another pseudo-random number by the same method. The PRNG method is analogous to the general encryption method of the invention as described in FIG. 3.

Example 4

Another aspect of the current invention is in the analysis of key bit-periods and shuffle-periods. In general, the shuffling operation of FIG. 5 is applied to any given data block. For any particular bit in the data block, we can count the number of shuffles it takes to return the bit to its original position, thus determining the bit-period for that bit. The shuffle-period of the key is simply the greatest common devisor of all the bit-periods. We can also see what the shuffle-period it by repeating the shuffling operation until the original data block is returned.

The above examples are provided to illustrate the invention but not to limit its scope. Other variants of the invention will be readily apparent to one of ordinary skill in the art and are encompassed by the appended claims. All publications, patents, and patent applications cited herein are hereby incorporated by reference.

Further Examples and Embodiments

The following section will be submitted by the inventor as a paper before Oct. 12, 1998 to the conference Eurocrypt '99, May 2–6, 1999, Prague, Czech Republic.

A New Design of Fast and Secure Block Cipher

Jayant Shukla

Jayant.Shukla@pacs.com

May 1999

This paper is about a new cryptographic algorithm, which is fast and is ideally suited for secure, high volume data communication and storage. The new algorithm is a symmetric block-cipher. The mathematical robustness and simplicity of this method brings a great improvement in security and speed compared to previous block-ciphers. The data block length or the key length can also be changed very easily and the changes do not require any redesign of the components of the cipher. This is a significant advantage over other block-ciphers, where extensive modifications are needed if the key or the data block length is to be altered, if this is even feasible.

1. Introduction

In this paper, I present a new cryptographic method. The invention belongs to a common class of cryptographic methods, known as "symmetric algorithms" which use the same key for encryption and decryption. The significant characteristic of this method is its mathematical robustness and simplicity, which brings a great improvement in security as well as the speed of execution, compared with other existing block-ciphers. Moreover, the block length or the key length can be changed easily without redesigning the components of the algorithm. This is a significant advantage over previous block ciphers, where extensive modification are needed if the length of the key or data block is to be changed, and sometimes it is not even possible to do so.

In this paper, I first present the background of the invention in §2. The details of the algorithm are presented in §3. The paper is concluded with a summary in §4.

2. Background

This new algorithm is a symmetric block-cipher, which uses the same key to encrypt a message as well as decrypt an encrypted message. The encryption or decryption is done on a fixed size data block at a time.

A very popular block cipher is DES, which was developed by IBM. It uses repeated application (rounds) of permutations, substitutions (based on a lookup tables which are called S-boxes, E-boxes and P-boxes), interchanging the left and the right half of the data block and exclusive OR operations (XORs). A detailed description of the algorithm can be found in Ehrsam [1]. DES algorithm has undergone extensive scrutiny by the cryptographic community. In the scientific community there are a few unanswered questions about the DES algorithm, e.g. why it has only 16 rounds and how and why the particular S-boxes, E-boxes and P-boxes were chosen. It has also been demonstrated by Shamir and Biham [4], that reduced-round (fewer than 16 round) variants of DES are susceptible to differential cryptanalysis.

The security of an encryption method can be enhanced by using many complex operations from different algebraic groups. The disadvantage is that these complex operations also require a lot of processing time. The complexity of the encryption methods also sometimes makes it hard to see if a trapdoor is hidden somewhere in the method. Another popular block cipher is IDEA, and it derives its security by mixing operations from different algebraic groups. A detailed description of the algorithm can be found in Massey [2]. The operations used in IDEA are the following:

Addition modulo $2^{16}$

XOR multiplication modulo $2^{16}+1$

The above mentioned examples of block ciphers help illustrate different ways of constructing block ciphers. They also help point out the shortcomings of the common block ciphers when used in real world applications. One can broadly classify the shortcomings of block ciphers into:

1. Susceptibility to cryptanalysis. Shamir and Biham [4] have successfully cryptanalysed many block ciphers including DES using differential cryptanalysis. Differential cryptanalysis has been very successful in breaking ciphers that use S-boxes. Other methods of cryptanalysis, such as linear cryptanalysis and dictionary attacks, have also been studied extensively.

2. Resource intensiveness. Ciphers such as IDEA use multiplication and addition to enhance the security, but these operations are computationally intensive. One can increase the encryption speed by using specialized hardware implementation of these algorithms. Because of the complexity of the operations used in the algorithms, even such hardware can be complex and expensive. In applications such as mobile communications, the cost and the power consumption are very important factors and should be kept as low as possible.

I have designed a method for data communication and storage that addresses the concerns about block ciphers mentioned above. The method described here avoids the use of many standard techniques used in encryption methods such as multiplication, addition, discrete logarithms, S-boxes. I use the XOR operations along with a new way to shuffle data blocks that can be easily implemented in hardware. In addition, these operations allow for the data block size and key size to be changed without significant modifications to the overall method. The latter, in particular, is a significant advantage over previous block ciphers such as DES where changes in the data block size or key length necessitate redesigning of the S-boxes, the E-boxes and the P-boxes. And since the operations are simple and their properties well understood in the art, trapdoors are unlikely to be present in the method.

The details of the method are described in §3.

3. Design of the Algorithm

As described by Shannon the idea behind encryption is to use confusion and diffusion to hide any ease to spot relationship between the plain-text and the cipher-text. Broadly speaking, confusion is introduced by changing plain-text locally and diffusion is introduced by spreading the plain-text over a larger region in the cipher-text. In this algorithm, many rounds of the three key operations: XOR1, shuffle and XOR2 are designed to introduce confusion and diffusion and thus to achieve the goal of encryption.

Figure 3:
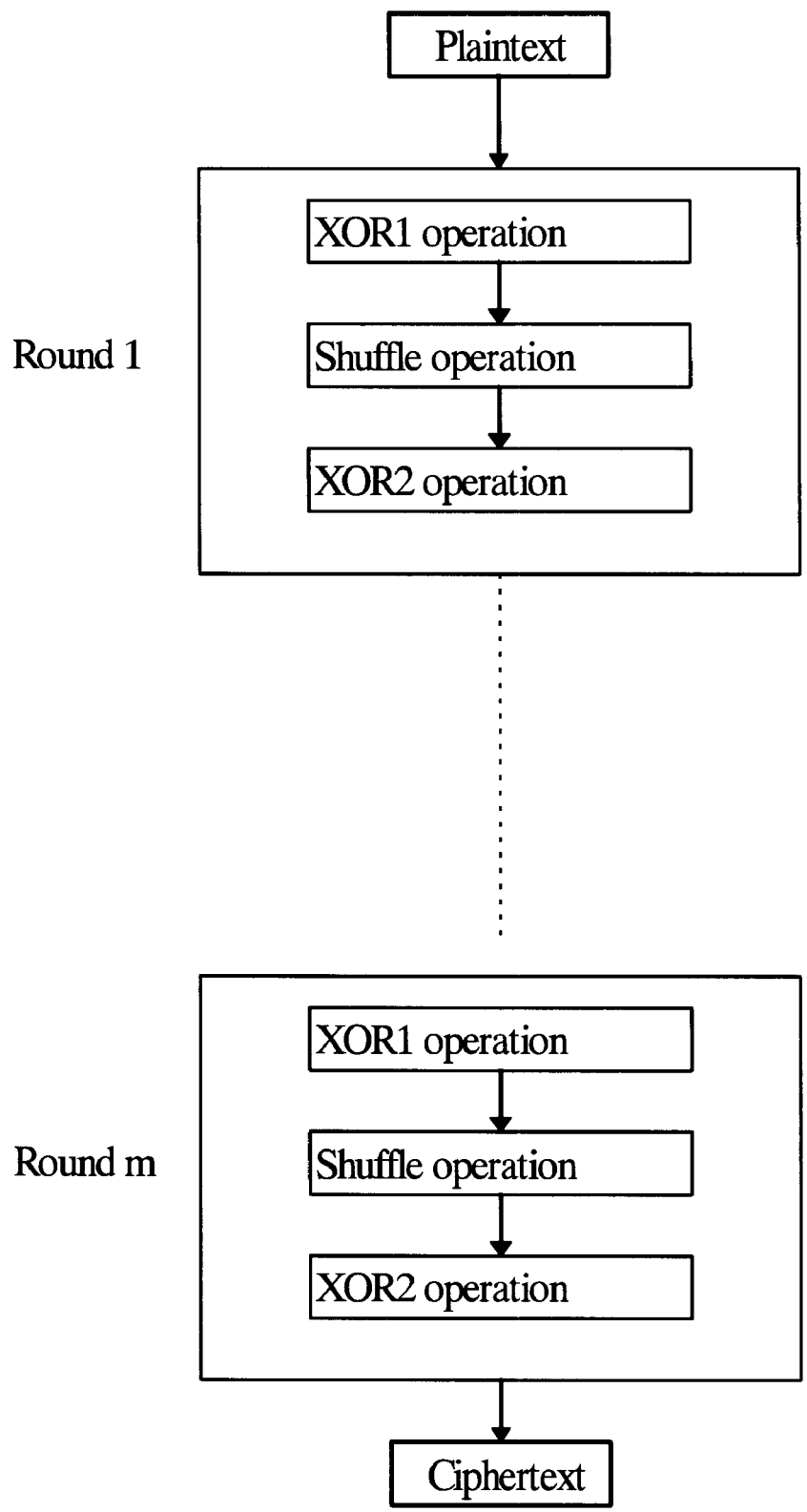
FIG. 3 shows the overall structure of the encryption algorithm. There are a total of "m" rounds and each round has three operations: XOR1, Shuffle and XOR2.

FIG. 3 shows the overall structure of the encryption algorithm. To produce the cipher-text of a given plain-text in the method, one needs a key, K, and a data string, S, which is used for the XOR operation. The steps involved in encryption are as follows:

1. Generation of the key K, and a string S, which are of the same length as that data block. The key is used for the shuffle operation and the string is used for one of the XOR operations in each round.
2. Splitting of the plain-text into data blocks of fixed length. If the last data block is smaller than the desired size, it is padded with extra bits to make it the same size as the other data blocks.
3. Repeated application (also known as "rounds") of three operations. The first operation is the XOR of the data block, D, with the string, S, to obtain a new data block, D1=XOR1(D,S). The second operation shuffles the bits of the data block, D1, to obtain a new data block, D2=SHUFFLE(D1,K). The last operation of every round is a second type of XOR that uses the bits of the data block, D2, and produces a new data block D3=XOR2(D2). After the last round we obtain the cipher-text which will be referred to as E.

XOR1 Operation

In the first XOR operation, XOR1, the data block is XORed with a string that has the same number of bits as the data block. The reason for doing the XOR operation on the data block using a randomly selected string is to hide the information about the relative number of zero and one bits in the plain text. For example, a data string which contains only zero, when XORed with a string with nearly equal number of zeros and ones will produce a new string which has nearly equal number of zeros and ones. The string used for the XOR operation is not a part of the key. It can be made public or not depending on the wishes of the individual. I recommend encrypting the string used for the XOR operation by applying a few rounds of the shuffle operation and/or the second type of XOR operation, XOR2, to it and then including it in the beginning of the cipher text. This way someone with the knowledge of the Key, K, can first obtain the string, S, and then use the key with the string to decipher the cipher text.

FIG. 4 shows how XOR1 operation is performed.

Shuffle Operation

After the XOR operation, XOR1, a highly non-linear operation is used to increase difflusion and confusion by shuffling the bits of the data block. The shuffling operation is similar to the way one shuffles a deck of playing cards. To shuffle a deck of cards, some cards are removed from the deck and then placed at the top or the bottom of the deck, this process is repeated several times. I achieve similar effect by removing some of the bits from the data block to produce two new data blocks and then concatenating them. FIG. 5 helps illustrate how the bit shuffling operation is done. The data block D1, is split into two blocks, F1 and F2. The new data block D2, is obtained by concatenating the data blocks F1 and F2 together. One can either put the block F1 after F2 or vice-versa to obtain the block D2. With several rounds of shuffling, one can alternate between D2=F1F2 in a round and D2=F2F1 in the next round. The process of generating data blocks, F1 and F2, from the original block D is done with the help of the key K. I start at the beginning of the data block, D1, if the corresponding bit in the key is zero, I move the bit from the data block to the new block, F1. If the corresponding bit of the key is one, I move the bit from the data block to the block F2. After I have finished this operation for all the bits in the data block I will have two new data blocks, F1 and F2. I construct a new data block D2, by concatenating the data block F1 behind the data block F2. See FIG. 5.

This shuffle operation has a few interesting properties.

1. If the first bit of the key (K) is one, then the first bit of data block (D1) and new data block (D2) are the same.
2. If the last bit of the key (K) is zero, then the last bit of the data block (D1) and new data block (D2) are the same.
3. If we repeatedly apply just the shuffle operation to a data block, after certain a number of iterations we will get back the original data block.

The number of iterations required to get back the original data block depends on the key. The concepts of "bit-period" and "shuffle-period" are useful ones here. The shuffle-period of a key is the number of shuffle operations that are required before we get back the original data block. Similarly, bit-period is defined as the number of shuffle operation required for a particular digit (or bit) at a particular position to return to its original position. FIG. 13 shows how the shuffle operation moves the digits (or bits) of a data block. We use digits in place of bits to show clearly how they move during the shuffle operation.

From FIG. 13 we can see that the positions occupied by the digit "4" through the shuffle operations are 4-1-5-2-6-3-7-8-4. That makes the bit period of the digit "4" equal to eight. In the example shown in FIG. 13, the bit-period of all other digits is also equal to eight. This makes the shuffle-period (which is the greatest common devisor of all the bit-periods) of the key also equal to eight, and after eight shuffle operations we get back the original data block that we started with.

The bit-period and shuffle period have strong implications on the its security. A method with relatively higher bit-period means that each bit in the data block will visit relatively more positions in the data block before returning to its original position, and thus be more difficult to cryptanalysis. The same reasoning applies to shuffle-periods. The entropy (amount of disorder or scrambling) introduced into the data will increase in the number of bits of the data block that can influence the bits in the encrypted data block. For a given key, the maximum entropy situation happens when the number of rounds used in the method is equal to exactly half the shuffle-period. Varying the number of rounds in the algorithm is not a very attractive alternative, therefore, we recommend that if the data block is 64 bits, that the number of rounds be set to 32.

The bit-periods and the shuffle-period in this method are effectively augmented by the accompanying XOR operations (XOR1 and XOR2). The result of XOR1 operation may increase the bit-periods by two-fold. If the string used in XOR1 operation is random, then statistically half the bit-periods would be doubled. This results in a significantly larger shuffle-period that will make the cryptanalysis of the method more difficult. Ideally the shuffle-period should be close to $2^n$, where "n" is the number of bits in the data block.

For a given key that has a shuffle period of p and for a data block D, we can generate a group A of p data blocks that can be transformed into one another by the shuffle and XOR1 operation. The shuffle-period can be significantly increased if we can provide a mechanism to transform the data block from a group A to a data block in another group B. This can be achieved by using another operation, XOR2.

XOR2 Operation

After the shuffle operation we perform the second XOR operation, XOR2. The reason for introducing this operation is to increase the shuffle-period as well as to enable bits of the data block to directly influence the bits of the new data block. For example, if we take two data blocks that only differ at only one position then the two data blocks after the shuffle operation will still differ from each other at only one position. This makes the method susceptible to differential cryptanalysis. FIG. 6 shows how the bits of the data blocks are XORed to generate a new data block. In the new data block, the first bit of the old data block influences all the bits of the new data block, the second bit of the data block influences bits second onwards of the new data block and so on. Because of this, changing just one bit in the data block (plain-text) will result in a significantly different cipher-text.

A variation of the scheme shown in FIG. 6 can be also used to achieve the similar effects. The particular bit can be XORed with some combination of other selected bits in the data blocks e.g. adjacent one bit, two bits, etc. FIG. 7 shows how the effect of the XOR operation shown in FIG. 6 can be reversed.

Another purpose that the XOR2 operation serves is to increase the effective shuffle-period and thus the difficulty to cryptanalysis. As explained in the earlier section, for a given key and a data block, a group A of data blocks can be generated associated with a certain shuffle operation, that any element in the group can be transformed into another element of the group through the shuffle operation. The effect of XOR2 operation is to allow the transition between different groups. Since different groups do not share elements (data blocks), it effectively increases the shuffle-period. The only case in which the shuffle-period will not increase will be when transforming the data block using XOR2 operation produces a data block in the same group. Chances of doing so are very small.

Decryption

To decrypt the cipher text E, a procedure similar to the one used in encrypting the data is followed. The number of rounds remains the same and each round has three operations. The operations are modified so that they reverse the effect of the operations used during the encryption.

The first operation of every round is an XOR operation, XOR3, shown in FIG. 7 (FIG. 9) which reverses the effect of the XOR operation XOR2, shown in FIG. 6 (FIG. 8). If we start with cipher text E, then the new data block after the XOR3 operation is E1=XOR3(E).

Next I seek to reverse the effect of the shuffle operation. I perform the shuffle operation on the data block E1 using the complement of the key K (K'), to obtain an intermediate data block E2=SHUFFLE(E1,K'). The new key K', is obtained by replacing all the zeros in the original key by ones and the ones by zeros. This is equivalent to saying that we do the decryption by using the key K, but reverse the way the strings F1 and F2 are concatenated together during the shuffle operation.

The last operation of each round is the XOR operation, XOR1, shown in FIG. 4, which is the first XOR operation of each round during encryption. This produces a new data block E3=XOR1(E2,S). After the last round I obtain the original data block D.

Random Number Generation

Another aspect of this encryption method is the generation of pseudo-random numbers, which can be used to encrypt data, among other uses. Because the method has an extremely large shuffle period for any given key, an extremely large sequence of numbers can be generated before repetition in the pattern of numbers begins to appear.

Pseudo-random number generation ("PRNG") uses a key K, and a data string S, to operate on another data string S2, which is the length as S. In each round of the PRNG, S2 is first XORed with S, just as in the XOR1 operation described in FIG. 4. The string is then shuffled using the key K, just as described in FIG. 8. Finally, the string is XORed using the XOR2 operation described in FIG. 6, thus giving us the new pseudo-random number. The new number is then used as the new S2 for generation of another pseudo-random number by the same method. The PRNG method is analogous to the general encryption method described in FIG. 3.

4. Summary

The new cryptographic method presented in this paper consists of many rounds of the newly designed XOR1, shuffle and XOR2 operations. The special feature of the method is that it is fast and secure, due to its mathematical robustness and simplicity. The significant advantages over the previous works, besides its speed, security and the ease to change the data block length. Because of the design of the algorithm, it is almost impossible to hide the trapdoors.

The above examples are provided to illustrate the invention but not to limit its scope. Other variants of the invention will be readily apparent to one of ordinary skill in the art and are encompassed by the appended claims. All publications, patents, and patent applications cited herein are hereby incorporated by reference.

REFERENCES

[1] W. F. Ehrsam, C. H. W. Meyer, R. L. Powers, J. L. Smith and W. L. Tuchman, "Product Block Cipher for Data Security," U.S. Pat. No. 3,962,539, Jun. 8, 1976.

[2] J. L. Massey and X. Lai, "Device for conversion of a Digital Block and Use of Same," U.S. Pat. No. 5,214,703, May 25, 1993.

[3] C. E. Shannon, "Communication Theory of Secrecy Systems," *Bell System Technical Journal,* v. 28, n. 4, 1949, pp. 656–715.

[4] E. Biham, A. Shamir, "Differential Cryptanalysis of the Data Encryption Standard," Springer-Verlag, ISBN 0-387-97930-1.

What is claimed is:

1. A method for encrypting plain-text D into cipher-text E, comprising the steps of:

splitting the plain-text D into N data blocks, each of the same length;

randomly selecting a data string S of the same length as each of the data blocks;

selecting a key K of the same length as each of the data blocks;

producing a XORed data block by a first XOR-type operation;

producing a shuffled data block by a shuffling operation;

producing a cipher data block by a second XOR-type operation;

iterating the steps of producing a XORed data block, producing a shuffled data block and producing a cipher data block for each of the N data blocks; and concatenating the cipher data blocks into the cipher-text E.

2. The method of claim 1 wherein the first XOR type-operation comprises the step of producing a new data block wherein each X bit of the new data block is the logical XOR of each X bit of one of the data blocks with each X bit of the data string S.

3. The method of claim 1 wherein the shuffling operation comprises the step of producing a new data block wherein each X bit of the XORed data block is placed in string F1 if each X bit of the key K is a zero and placed in string F2 if each X bit of the key K is one, and after placing all of the bits of the XORed data block, the string F1 and the string F2 are concatenated to produce the new data block.

4. The method of claim 1 wherein the second XOR-type operation comprises the step of producing a new data block wherein the first bit of the cipher data block is the same as the first bit of the shuffled data block, and each X bit of the new data block is the logical XOR of each X bit of the shuffled data block with each (X−1) bit of the shuffled data block.

5. The method of claim 1 wherein the second XOR-type operation comprises the step of producing a new data block wherein the first bit of the new data block is the same as the first bit of the shuffled data block, and each X bit of the new data block is the logical XOR of each X bit of the shuffled data block with the (X−1) bit of the new data block.

6. The method of claim 1 wherein the steps of producing a XORed data block, producing a shuffled data block and producing a cipher data block are repeated a predetermined number of times for the data block.

7. A method for generating a pseudo-random number, comprising the steps of:
    selecting a base string B;
    randomly selecting a data string S of the same length as the base string B;
    selecting a key K of the same length as the base string B;
    producing a XORed string by a first XOR type operation;
    producing a shuffled string by a shuffling operation; and
    producing the pseudo-random number by a second XOR-type operation.

8. The method of claim 7 wherein the first XOR-type operation comprises the step of producing a new data block wherein each X bit of the new data block is the logical XOR of each X bit of the base string B with each X bit of the data string S.

9. The method of claim 7 wherein the shuffling operation comprises the step of producing a new data block wherein each X bit of the XORed string is placed in string F1 if each X bit of the key K is a zero and placed in string F2 if each X bit of the key K is one, and after placing all of the bits of the XORed string, the string F1 and the string F2 are concatenated to produce the new data block.

10. The method of claim 7 wherein the second XOR-type operation comprises the step of producing a new data block wherein the first bit of the new data block is the same as the first bit of the shuffled string, and each X bit of the new data block is the logical XOR of each X bit of the shuffled string with each (X−1) bit of the shuffled data block.

11. The method of claim 7 wherein the second XOR-type operation comprises the step of producing a new data block wherein the first bit of the new data block is the same as the first bit of the shuffled string, and each X bit of the new data block is the logical XOR of each X bit of the shuffled string with each (X−1) bit of the new data block.

12. The method of claim 7 wherein the pseudo-random number is used as a new base string B for the generation of an additional pseudo-random number.

13. A method for determining a bit-period of key K, comprising the steps of:
    selecting a data block;
    selecting a key K of the same length as the data block;
    choosing a particular bit of the data block to study;
    producing a shuffled data block, wherein each X bit of the data block is placed in string F1 if each X bit of the key K is a zero and placed in string F2 if each X bit of the key K is one, and after placing all of the bits of the data block, the string F1 and the string F2 are concatenated to produce the shuffled data block;
    using the shuffled data block as a new data block and repeating the producing step, until the particular bit returns to its original position, thus determining the bit-period of the particular bit.

14. A method for determining the shuffle period of key K, comprising the steps of:
    selecting a data block;
    selecting a key K of the same length as the data block;
    choosing a particular bit of the data block to study;
    producing a shuffled data block, wherein each X bit of the data block is placed in string F1 if each X bit of the key K is a zero and placed in string F2 if each X bit of the key K is one, and after placing all of the bits of the data block, the string F1 and the string F2 are concatenated to produce the shuffled data block;
    using the shuffled data block as a new data block and repeating the producing step, until the shuffled data block is identical to the data block, thus determining the shuffle period of key K.

15. A cryptographic storage or communications system, comprising:
    a communications channel;
    encrypting logic for encrypting plain-text D into cipher-text E, wherein the encrypting logic:
        splits the plain-text D into N data blocks, each of the same length;
        takes or randomly selects a data string S of the same length as each of the data blocks;
        takes or selects a key K of the same length as each of the data blocks;
        produces a XORed data block by a first XOR-type operation;
        produces a shuffled data block by a shuffling operation;
        produces a cipher data block by a second XOR-type operation;
        iterates the steps of producing a XORed data block, producing a shuffled data block and producing a cipher data block for each of the N data blocks; and
        concatenates the cipher data blocks into the cipher-text E.

16. The system of claim 15 wherein the first XOR type-operation comprises the step of producing a new data block wherein each X bit of the new data block is the logical XOR of each X bit of one of the data blocks with each X bit of the data string S.

17. The system of claim 15 wherein the shuffling operation comprises the step of producing a new data block wherein each X bit of the XORed data block is placed in string F1 if each X bit of the key K is a zero and placed in string F2 if each X bit of the key K is one, and after placing all of the bits of the XORed data block, the string F1 and the string F2 are concatenated to produce the new data block.

18. The system of claim 15 wherein the second XOR-type operation comprises the step of producing a new data block wherein the first bit of the cipher data block is the same as the first bit of the shuffled data block, and each X bit of the new data block is the logical XOR of each X bit of the shuffled data block with each (X−1) bit of the shuffled data block.

19. The system of claim 15 wherein the second XOR-type operation comprises the step of producing a new data block wherein the first bit of the new data block is the same as the first bit of the shuffled data block, and each X bit of the new data block is the logical XOR of each X bit of the shuffled data block with the (X−1) bit of the new data block.

20. The system of claim 15 wherein the encrypting logic repeats the steps of producing a XORed data block, producing a shuffled data block and producing a cipher data block a predetermined number of times for the data block.

* * * * *